Sept. 5, 1961  M. METH  2,999,013
METHOD OF MAKING GLASS NON-REFLECTIVE
Filed Nov. 3, 1959
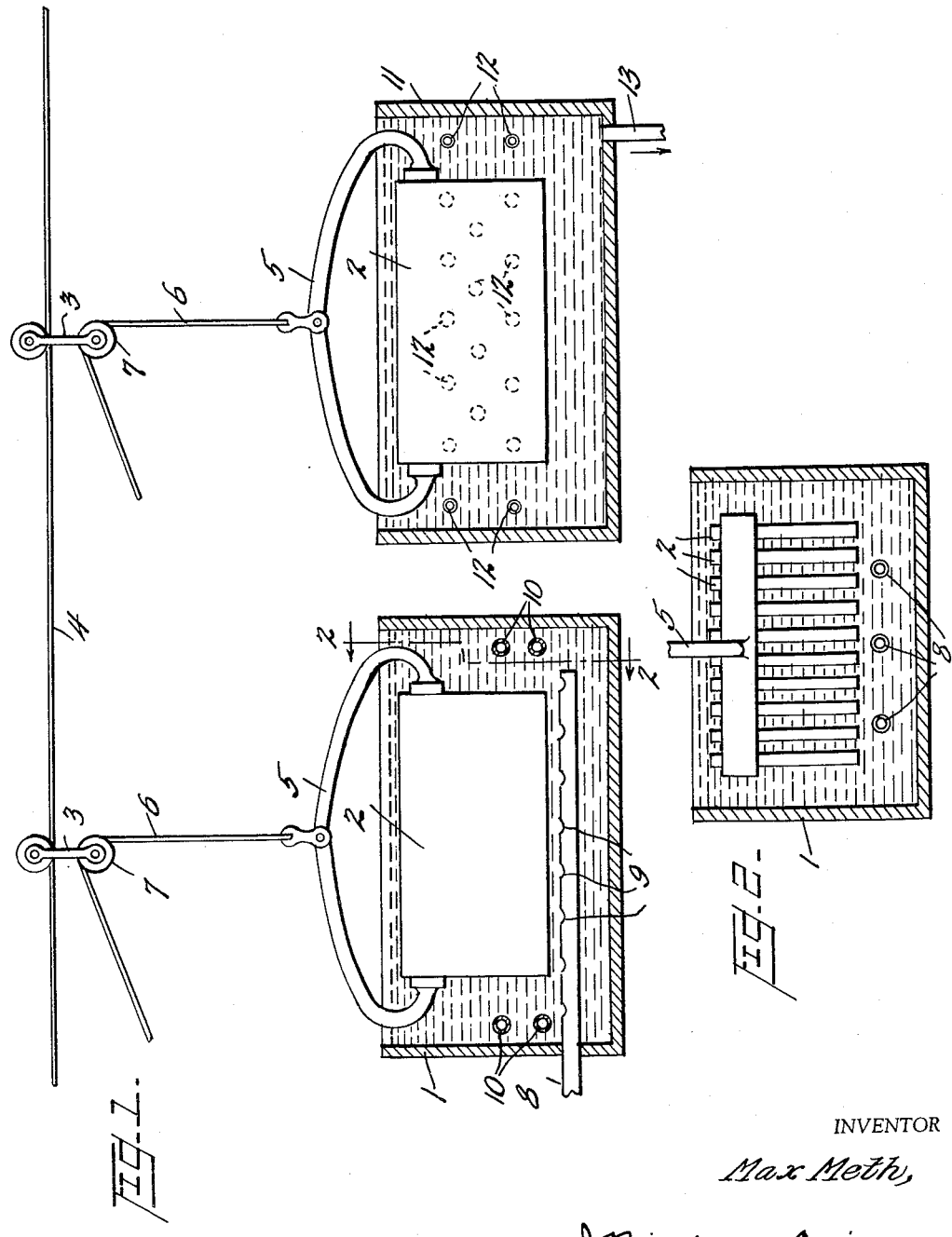
INVENTOR
Max Meth,
BY Windsor Davis
ATTORNEY

United States Patent Office 2,999,013
Patented Sept. 5, 1961

2,999,013
METHOD OF MAKING GLASS NON-REFLECTIVE
Max Meth, 212 Atlantic Ave., Atlantic City, N.J.
Filed Nov. 3, 1959, Ser. No. 850,638
2 Claims. (Cl. 41—42)

This invention relates to the treatment of glass surfaces in order to obviate their natural reflective qualities and has for its object to provide means for breaking up the reflections by roughening such surfaces then partially removing the roughening by acid treatment to ameliorate the roughness and to restore the light transmitting properties. The invention has particular adaptability to the exposed areas of television picture tubes but will be highly useful when applied to display cases and to glass which covers pictures and in numerous other places where light reflection is objectionable.

The process entails an initial roughening of the glass surface but this step of the process contains no novelty except in combination with the other steps. The roughening may be done by sandblasting, grinding or acid etching, or in any other way to obtain a roughness having small cavities of the order of two or three mils depth. Hereinafter I refer to all of these forms of roughening by the term "etching."

The principal object of the invention is to provide additional process steps wherein etched glass may be treated by one or not more than two dippings in an acid bath to remove practically all but not quite all of the etching, in a rapid manner suitable for mass production methods.

It is known that glass may be etched by applying hydrofluoric acid thereon. It is also known that when a glass surface has been ground that a smooth or slick appearance may be restored thereto by repeatedly dipping and rinsing the ground surface in hydrofluoric acid. A solution of hydrofluoric and sulphuric acid will similarly restore the surface. The acids dissolve a very thin film of glass thus forming a scum over the ground or etched portion. It is necessary to remove the glass, rinse it with water in order to remove the scum, then re-dip it in the acid. According to all prior practices these steps must be repeated a substantial number of times before the desired smoothness has been obtained.

I have found that it is possible to remove the etching to a substantial depth by a single dipping of the glass surface by subjecting the acid solution to substantial agitation. The agitation may be accomplished in any one of several ways, but I prefer to introduce air therein in such quantity that the dissolved glass does not form a scum coating on the treated surface. In other words, the scum or dissolved glass is continuously floated away as it forms, so that the actual glass surface continues to be exposed.

Another aspect of prior art processes is that when the etched glass is subjected to alternate dippings and water rinses, an amount of rinse water goes into the solution after each rinse thus gradually diluting the acid solution. When the solution becomes seriously affected by the dilution it is then discarded. Thus, there is the expense of replacing the solution and furthermore, disposal of the waste solution presents a serious problem since the solution, by its nature, can easily endanger health.

As will be hereinafter explained, I have found that the solution may be maintained at an operative purity by constantly supply heat thereto of the order of 100° F., thus eliminating the problem of frequently disposing of waste solutions and also reducing the cost of replacing the solutions.

The invention will be better understood with reference to the accompanying drawing wherein the equipment is illustrated and the steps of the process involving the acid base and water rinse are explained in connection therewith.

FIGURE 1 illustrates a vertical transverse section through a vat containing acid and through a vat containing water rinsing means, and FIGURE 2 is a transverse vertical section through the acid vat, taken along the line 2—2 of FIGURE 1.

More particularly, I provide a vat 1 of sufficient size to accommodate the articles to be immersed. While a plain sheet of etched glass 2 is illustrated, for purposes of explanation, it will be understood that the glass may be of any size or shape. It should also be understood that only one piece of glass 2 is seen but that there is a multiplicity of identical sheets arranged in the vat 1 in parallel spaced relation for simultaneous, mass treatment. Since the action is the same for all, the explanation will deal with only one, for purposes of simplicity.

The vat 1 is filled with a solution of hydrofluoric acid and sulphuric acid to a depth such that the sheet 2 may be completely immersed therein. The etched sheet 2 is transported to a position immediately above the vat by any suitable means such as a trolley 3 supported by a trolley wire 4. A pair of tongs 5 is attached to a line 6 which overrides a pulley 7 carried by the trolley 3. Thus the sheet 2 may be immersed in the acid in the vat and allowed to remain for any desired length of time.

Through the lower part of the walls of the vat I insert a plurality of pipes 8 each having several openings 9 through the wall thereof. The pipes may be made of any material resistant to the acid such as ceramic, stainless steel or lead and are each connected to a source of compressed air supply. The acid solution is thus subjected to very substantial agitation so that the scum formed on the surface of the glass by the acid will be largely removed as it forms. The acids thus continue to dissolve the surface of the glass as long as the sheet 2 remains immersed. In this way I am able to remove the desired amount of surface at a single dipping.

The amount or depth of surface to be removed depends upon the depth of the etching, and the amount of time required for immersion depends upon the amount or depth of surface to be removed and the strength and proportions of the acids. A typical etching of a frosted glass may form indentations to a depth of 1.5 to 2 mils. I have found that an acid solution composed of 90% hydrofluoric acid and 10% sulphuric acid when agitated, will remove as much as 1.5 mils of glass surface in about 10 seconds. A solution composed of 75% hydrofluoric acid and 25% sulphuric acid will remove as much as 1.5 mils of surface in 15 to 20 seconds. A solution composed of 50% hydrofluoric acid and 50% sulphuric acid will require a time of the order of 30 to 40 seconds for the same surface removal. With longer periods of immersion I may progressively decrease the strength of the acid down to 10% hydrofluoric and 90% sulphuric. The preferred range is a 90% to 50% solution of hydrofluoric acid with 10%–50% solution of sulphuric acid and, within this preferred range, a 50%–50% solution appears most satisfactory for production purposes. The acids are of a strength known as commercially pure.

I have found also that while this process may be carried out, as above described, with a single dip, that some operators believe that a better control is obtained by using the 50–50 solution and a double dip with a water rinse intervening. A principal objection to using a water rinse and then returning the wet glass to the solution is that the residual water on the glass dilutes the solution. I have found that the water thus carried into the solution may be continuously driven off if the solution is maintained at a temperature between 80° and 130° F. I prefer a constant temperature of 100° F. The solution in the vat may be heated by electric cables or hot water pipes 10 and will operate for prolonged periods of time without changing the solution.

With this general guide a very few trial immersions will show the exact length of time necessary for the particular glass articles to be treated. Thereafter, each article can be immersed for the selected time and this step of the operation can then be carried out with precision and with the rapidity required for a good production line.

At the end of the selected time, the sheet or article 2 is elevated from the vat 1 by pulling on the line 6. The sheet 2 is conveyed on the trolley wire 4 above a second vat 11 where it is lowered therein. The vat 11 is equipped with a series of water sprays 12 where the sheet is thoroughly water rinsed. The residue drains through the line 13. The sheet 2 is then removed from the vat 11 by pulling on the line 6 and conveyed to a suitable place for drying. Or, when it is considered desirable, the article may be immersed again in the acid solution in the vat 1 and again water rinsed.

The agitation is here shown as being caused by the introduction of air under pressure. There are obviously many other ways in which the acid solution may be agitated but a single illustration will suffice to show the principle involved.

I desire to be extended protection as defined by the scope of the appended claims.

What I claim is:

1. The process of forming a non-reflective window glass surface which consists in roughening the surface of a glass article to a depth of 1.5 to 2 mils in order to provide a heavy frosting thereof, in then immersing the roughened surface in an acid solution having a temperature between 100° F. and 130° F. and composed of 90%–50% by volume of hydrofluoric acid and 10%–50% by volume of sulphuric acid for a period of time ranging from 10 to 40 seconds thereby removing a partial amount but less than all of said frosting, in continuously subjecting said acid solution to substantial agitation by injecting a stream of air therein during the immersion whereby scum formed on said surface by said acids is continuously removed as formed, and in then removing said surface from said solution, and in thoroughly water rinsing it.

2. The process of forming a non-reflective window glass surface which consists in roughening the surface of a glass article to a depth of 1.5 to 2 mils in order to provide a heavy frosting thereof, in then immersing the roughened surface in an acid solution composed of 50% by volume of hydrofluoric acid and 50% by volume of sulphuric acid for a period of time of about 30–40 seconds thereby removing substantially all but less than all of said frosting, said solution being heated to a temperature between 100° F. and 130° F., in subjecting the solution to agitation by feeding compressed air continuously therein whereby scum formed on said surface by said acids is constantly removed as formed, in removing said surface from said solution and in subjecting said surface to a thorough water rinsing.

References Cited in the file of this patent

UNITED STATES PATENTS

| | | |
|---|---|---|
| 1,016,487 | Freer | Feb. 6, 1912 |
| 1,240,398 | Wood | Sept. 18, 1917 |
| 1,313,233 | Grass | Aug. 12, 1919 |
| 2,036,647 | Achauer | Apr. 7, 1936 |
| 2,328,533 | Walker | Aug. 31, 1943 |
| 2,348,704 | Adams | May 16, 1944 |
| 2,370,214 | Walker | Feb. 27, 1945 |
| 2,372,536 | Walker | Mar. 27, 1945 |
| 2,410,300 | Nicoll | Oct. 29, 1946 |
| 2,670,279 | Szegho et al. | Feb. 23, 1954 |

FOREIGN PATENTS

| | | |
|---|---|---|
| 196,421 | Great Britain | Apr. 26, 1943 |